（12) United States Patent
Banatwala et al.

(10) Patent No.: US 7,962,550 B2
(45) Date of Patent: Jun. 14, 2011

(54) MANAGING EXTERNAL DATA SOURCES IN A DISCUSSION FORUM RESOURCE

(75) Inventors: Mustansir Banatwala, Hudson, NH (US); Stephen J. Foley, Quincy, MA (US); Alexander Kordun, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2375 days.

(21) Appl. No.: 10/736,293

(22) Filed: Dec. 16, 2003

(65) Prior Publication Data

US 2005/0138121 A1 Jun. 23, 2005

(51) Int. Cl.
*G06F 15/16* (2006.01)
(52) U.S. Cl. ......... 709/204; 709/205; 709/206; 709/207
(58) Field of Classification Search .................. 709/204
See application file for complete search history.

(56) References Cited

U.S. PATENT DOCUMENTS

2001/0028364 A1* 10/2001 Fredell et al. ................. 345/751
* cited by examiner

*Primary Examiner* — John Follansbee
*Assistant Examiner* — Maceeh Anwari
(74) *Attorney, Agent, or Firm* — Steven M. Greenberg, Esq.; Carey, Rodriguez, Greenberg & Paul

(57) ABSTRACT

The present invention is a method, system and apparatus for managing external data sources in a discussion forum resource. A discussion forum resource can include at least one topic thread disposed in the discussion resource forum and created for externally sourced content in the discussion forum resource. The discussion forum resource further can include a data aggregator coupled to the topic thread and configured to manage the externally sourced content in the topic thread. Notably, the externally sourced content can include text, audio, imagery or video.

4 Claims, 2 Drawing Sheets

MANAGING EXTERNAL DATA SOURCES IN A DISCUSSION FORUM RESOURCE

BACKGROUND OF THE INVENTION

1. Statement of the Technical Field

The present invention relates to the field of collaborative computing and more particularly to the management of postings to a discussion forum resource.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, application sharing, shared document libraries and discussion forums.

In the conventional discussion forum, collaborators post message to a common document referred to as a "blackboard". Whenever a collaborator posts a message to the black board, other participant collaborators can view the comments, though some conventional discussion forum implementations control access to discussion boards according to access control lists and the like. In any event, discussion forums typically are passive modes of collaboration in which collaborators view one another's postings asynchronously when convenient. Still, some discussion forums are more active in nature in as much as an e-mail can be transmitted to "members" of a discussion form when a new posting occurs.

Generally, discussion forums follow a temporal sequence when formatting postings. In this regard, each posting is placed after the next in order of the time when the posting was placed in the discussion forum. As a result, one can follow multiple conversations through a single reading of the discussion forum as two adjacent postings are not necessarily related to one another. It will be recognized by the skilled artisan, then, that a single discussion forum can become unwieldy when too many conversations regarding too many topics are placed in sequence in a single forum. To address this issue, most discussion forums are subdivided into separate topic threads in order to provided enhanced readability in regard to the postings of any one topic thread.

The discussion forum resource has become a ubiquitous component of collaborative environments. A keyword searching of the Web space literally can produce tens of thousands of resulting links to discussion forums disposed about the World Wide Web. Despite the diversity of topic threads in Web space, it will not surprise the skilled artisan to note that substantial topic overlap exists between different discussion resources. Yet, as a collaborator, to participate in posting and viewing comments about different topic threads having similar topical content in different discussion resources can be time consuming and terribly inefficient. To that end, a substantial deficiency remains in the collaborative environment in respect to the management of topically related postings in a discussion forum resource.

SUMMARY OF THE INVENTION

The present invention addresses the deficiencies of the art in respect to managing postings to discussion forum and provides a novel and non-obvious method, system and apparatus for including external data sources in a discussion forum. In accordance with the present invention, a discussion forum resource can include at least one topic thread disposed in the discussion resource forum and created for externally sourced content in the discussion forum resource. The discussion forum resource further can include a data aggregator coupled to the topic thread and configured to manage the externally sourced content in the topic thread. Notably, the externally sourced content can include text, audio, imagery or video.

In a preferred aspect of the invention, however, the externally sourced content can include postings for another discussion forum resource. In this regard, the data aggregator further can include a configuration for writing responsive postings in the thread disposed in the discussion forum resource to another discussion forum resource. Consequently, viewers of the other discussion forum resource need not view the discussion forum resource in order to view the responsive postings.

A discussion forum management method can include the steps of receiving externally sourced data for posting in a discussion forum resource and creating a new topic thread for the externally sourced data. Responsive postings to the externally sourced data can be permitted in the new topic thread. Subsequently, it can be determined whether subsequently received postings are responsive postings which relate to the externally sourced data. If so, the subsequently received postings can be posted to the external data source.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for the management of external data sources in a discussion resource forum. In accordance with the present invention, a discussion forum resource can be provided in which collaborators can post messages for viewing by other authorized collaborators. The posted messages can include text, audio, imagery or any combination thereof. The posted messages can be posted in a single topic thread, or across multiple topic threads in the discussion forum resource.

Importantly, the discussion resource forum can be configured to incorporate externally sourced data or addressable links to externally sourced data, such as Web sites, remotely disposed media files, data from news groups, or even the postings of other discussion forums. Additionally, to the extent that the external source permits, postings relating to the externally sourced data can be provided to the external source for posting therein. More specifically, where the external source is an externally disposed discussion forum, postings relating to the externally sourced data can be posted in the externally disposed discussion forum.

Figure 1:
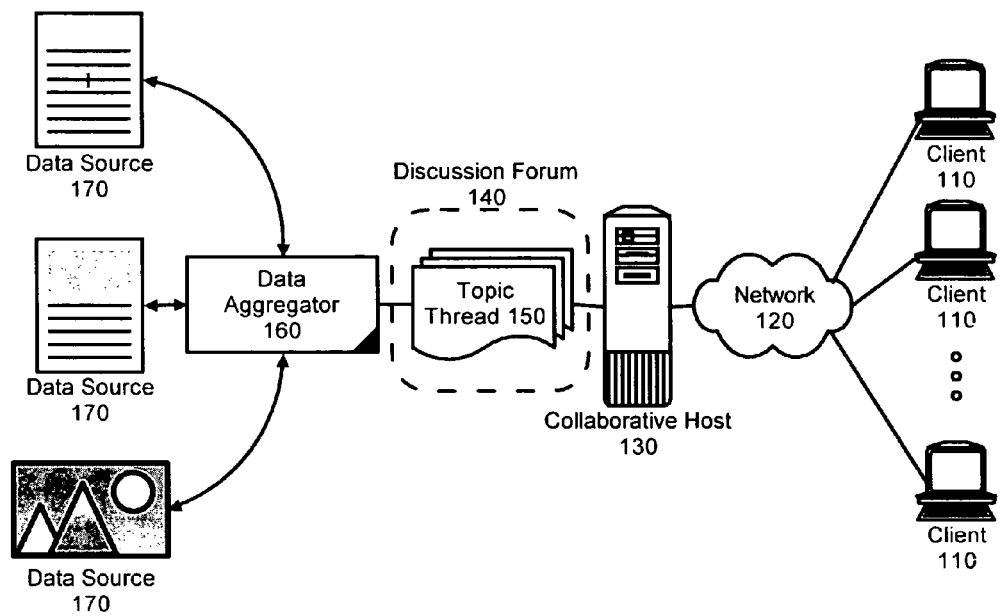
FIG. 1 is schematic illustration of a collaborative environment having a discussion forum resource configured in accordance with the present invention.

In further illustration of the preferred implementation of the present invention, FIG. 1 is schematic illustration of a collaborative environment having a discussion forum resource configured in accordance with the present invention. The system can include a collaborative host 130 coupled to one or more client devices 110 over a computer communications network 120. Disposed within the collaborative host 130, a discussion forum resource 140 can host one or more topic threads 150.

In accordance with the present invention, a data aggregator 160 can be coupled to the discussion forum 140. The data aggregator 160 can include a configuration for linking external data sources 170 to postings within the topic threads 150 of the discussion forum resource 140. In particular, individual collaborators through the client devices 110 can direct the data aggregator 160 to link content from the external data sources 170 into the topic threads 150 of the discussion forum resource 140.

In this regard, the data aggregator 160 can retrieve the content from the data sources 170 or a link to the content from the data sources 170 and the data aggregator 160 can place the retrieved content or the link to the content from the data sources 170 in the specified one of the topic threads 150. Preferably, the data aggregator 160 can create a new one of the topic threads 150 for the content from the data sources 170. In this way, all postings to the new one of the topic threads 150 can be considered as related postings to the content from the data sources 170.

Importantly, to the extent that the external data sources 170 include other discussion forum resources, news groups, chat rooms and the like, responsive postings to content provided from the external data sources 170 can be provided to the external data sources 170 through the data aggregator 160. In particular, the responsive postings can be provided as postings to the discussion forum resource in the external data sources 170. To better illustrate the foregoing aspect of the present invention, FIG. 2 is a pictorial illustration of two discussion resources sharing external data source postings between one another in accordance with the inventive arrangements.

Figure 2:
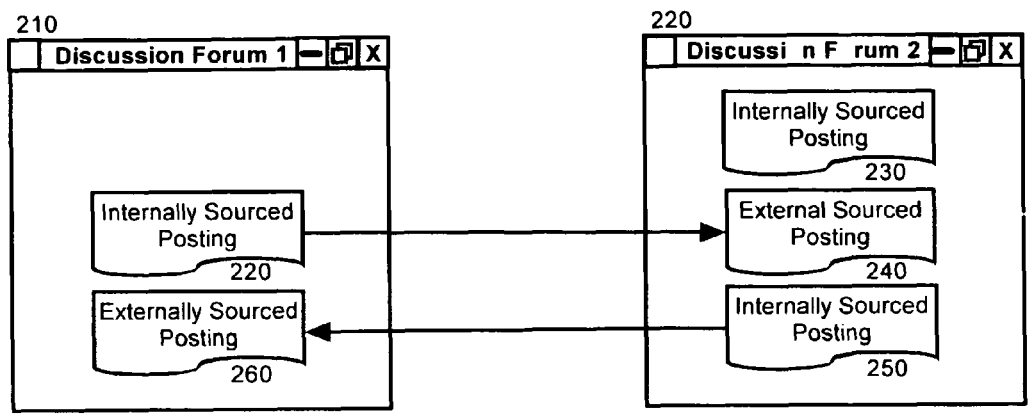
FIG. 2 is a pictorial illustration of two discussion resources sharing external data source postings between one another in accordance with the inventive arrangements; and, FIG. 3 is a flow chart illustrating a process for managing external data sources in the discussion resource of FIG. 1.

Referring now to FIG. 2, a first discussion forum resource 210 can be disposed externally from a second discussion forum resource 220 which has been configured in accordance with the present invention. The second discussion forum resource 220 can include a sequence of postings 230, 240, 250. One of the postings 230, 240, 250 can include an externally sourced posting 240. The externally sourced posting can be retrieved from the first discussion forum resource 210 which can correspond to the internally sourced posting 220 disposed within the first discussion forum resource 210.

Importantly, when a responsive posting 250 has been posted to the second discussion forum resource 210, the responsive posting 250 can further be posted to the first discussion forum 210 as an externally sourced posting 260.

Consequently, the collaborators participating in the first discussion forum resource 210 can enjoy the benefit of both the internally source posting 220 and the externally sourced posting 260 without having to navigate both the first discussion forum resource 210 and the second discussion forum resource 220. Similarly, the collaborators participating in the second discussion forum resource 220 can enjoy the benefit of both the internally source postings 230, 250 and the externally sourced posting 240 without having to navigate both the first discussion forum resource 210 and the second discussion forum resource 220.

Figure 3:
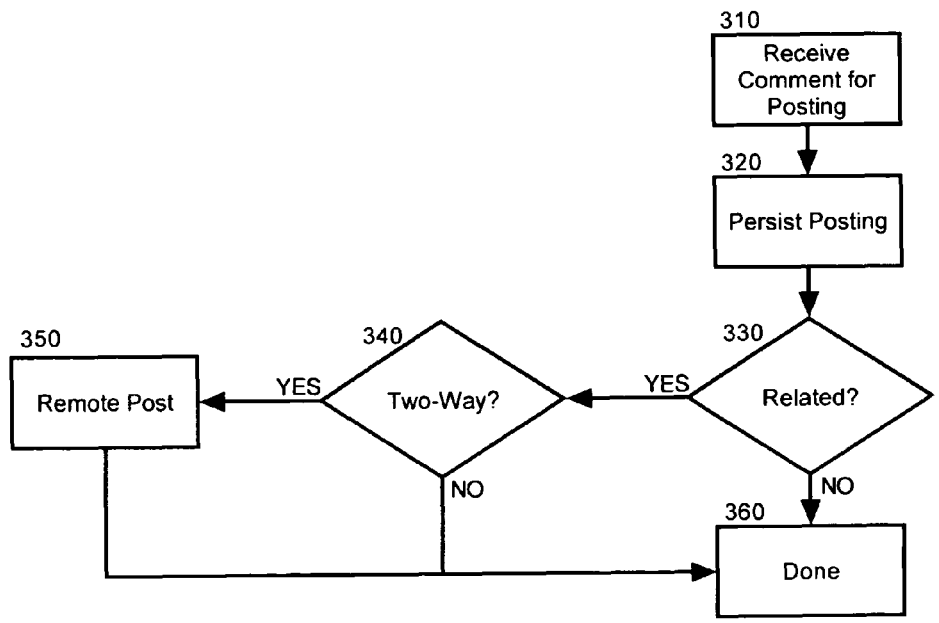

To facilitate the two-way interactive nature of two or discussion forum resources, the data aggregator of the present invention can be configured to process responsive postings to postings from external data source. In illustration, FIG. 3 is a flow chart illustrating a process for managing external data sources in the discussion resource of FIG. 1. Beginning in block 310, a comment can be received for posting in the discussion forum resource. In block 320, the posting can be persisted to storage for the discussion forum resource which can involve writing the posting to a record in a database, or to a document constituting all or part of the discussion forum resource.

In decision block 330, it can be determined whether the posting relates to an externally sourced posting. For instance, where the posting is a reply to an externally sourced posting in a thread dedicated to the externally sourced posting, the reply can be considered to be related to the externally sourced posting. If so, in block 340 it can be determined whether the external data source for the externally sourced posting can accept new postings. If so, the external data source will be considered a "two-way" data source and in block 350 the reply can be posted to the external data source. Finally, in block 360 the process can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A machine readable storage having stored thereon a computer program for discussion forum management, the computer program comprising a routine set of instructions which when executed by a machine cause the machine to perform the steps of:
  receiving externally sourced data for posting in a discussion forum resource;
  creating a new topic thread for said externally sourced data; and,
  responsively posting[s] to said externally sourced data in said new topic thread.

2. The machine readable storage of claim 1, further comprising the steps of:
  determining whether subsequently received postings are responsive postings which relate to said externally sourced data; and,
  posting said subsequently received postings to said external data source if it is determined that said subsequently received postings are responsive postings which relate to said externally sourced data.

3. The machine readable storage of claim 1, wherein said externally sourced data comprises data selected from the group consisting of text, audio, imagery and video.

4. The machine readable storage of claim 1, wherein said externally sourced data comprises postings for another discussion forum resource.

* * * * *